United States Patent [19]

Ban

[11] Patent Number: 4,614,314
[45] Date of Patent: Sep. 30, 1986

[54] SPINNING REEL
[75] Inventor: Masuo Ban, Sakai, Japan
[73] Assignee: Shimano Industrial Company Limited, Osaka, Japan
[21] Appl. No.: 635,184
[22] Filed: Jul. 27, 1984
[30] Foreign Application Priority Data Jul. 27, 1983 [JP] Japan ................................. 58-138087
Oct. 18, 1983 [JP] Japan ........................... 58-161435[U]

[51] Int. Cl.⁴ ............................................ A01K 89/01
[52] U.S. Cl. .......................... 242/84.2 G; 242/84.2 R
[58] Field of Search ..................... 242/84.1 R, 84.2 R, 242/84.21 R, 84.5 R, 84.5 A, 84.51 R, 84.51 A; 188/82.3, 82.34, 82.4; 74/576, 577

[56] References Cited
U.S. PATENT DOCUMENTS

| 3,138,344 | 6/1964 | Small | 242/84.21 R |
| 3,342,442 | 9/1967 | Brantingson | 242/84.2 G |
| 3,540,306 | 11/1970 | Nurmse | 242/84.2 R |
| 3,974,978 | 8/1976 | Henze | 242/84.1 R |
| 4,340,189 | 7/1982 | Volkert et al. | 242/84.1 R |

Primary Examiner—Billy S. Taylor
Attorney, Agent, or Firm—Stevens, Davis, Miller & Mosher

[57] ABSTRACT

A spinning reel is provided with a rotary frame having a fishing line retainer reciprocally swingable between a line winding-up position and a line release position, a drive mechanism for driving the rotary frame, a spool for winding-up thereon a fishing line by rotation of the rotary frame driven by the drive mechanism, a first anti-reverse-rotation mechanism having a plurality of teeth, a second anti-reverse-rotation mechanism having one tooth corresponding to the position where the line retainer is optimally adapted for inverse swinging motion, and a release mechanism for allowing the first anti-reverse-rotation mechanism to rotate in reverse when the drive mechanism reversely rotates the rotary frame.

2 Claims, 12 Drawing Figures

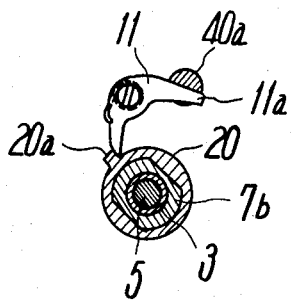
FIG. 3
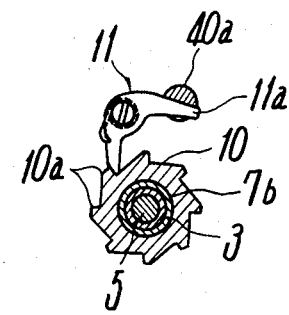
FIG. 4
FIG. 5
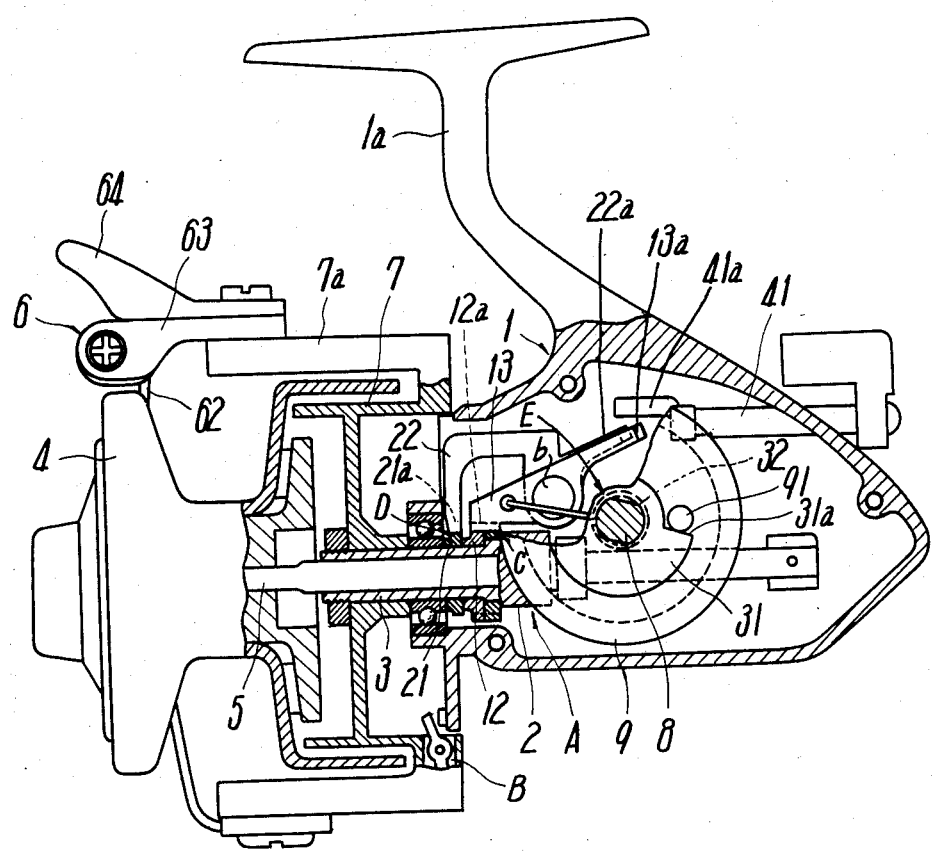
FIG. 6
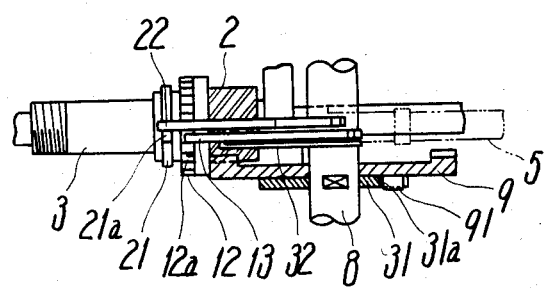

SPINNING REEL

FIELD OF THE INVENTION

This invention relates to a spinning reel, and more particularly to a spinning reel provided with a rotary frame having a fishing line retainer reciprocally swingable between a line winding position and a line release position, a drive mechanism for driving the rotary frame, a spool onto which the line is wound by the rotary frame rotatably driven by the drive mechanism, and an anti-reverse-rotation mechanism for restraining the rotary frame from reverse rotation.

BACKGROUND OF THE INVENTION

Generally, an angler, when using the above-described kind of spinning reel for casting, stops the line retainer at the position where it is suitable for reciprocal swinging motion and contacts the line with his finger in the vicinity of the spool to dray out the line. The line retainer, however, is structurally impossible to stop always at the suitable position, whereby the preparatory operation for casting is troublesome, takes much time and is very inconvenient.

Conventionally, a fishing reel as cited in the Japanese Utility Model Publication No. Sho 52-26,469 has hitherto been proposed which uses an anti-reverse-rotation mechanism comprising an anti-reverse-rotation gear provided at its outer periphery with a plurality of teeth and an anti-reverse-rotation pawl engageable with one tooth at the gear. The anti-reverse-rotation gear has one tooth projecting outwardly more than is other teeth. The pawl is switched in three stages with respect to a first position where the pawl is engageable with each tooth of the gear, a second position where the pawl is not engageable with the same, and a third position where the pawl is engageable with the projecting tooth only. Hence, the pawl is kept switched to the third position and the rotary frame is reversely rotated, so that the pawl engages with the projecting tooth to thereby stop the rotary frame always in one proper position for its reciprocal swinging motion.

Such conventional reel, however, is so constructed that when the pawl is in the third position, the rotary frame rotates about once to a maximum in the reverse rotation direction until the pawl engages with the projecting tooth, whereby the pawl should, for example, after casting, be switched to the first position and engage with one tooth at the gear in order to restrain the rotary frame from its reverse rotation. In a case where the pawl is not switched as the above or the switching is forgotten, in other words, the angler carriers out casting in the condition wherein the pawl is in the third position, and thereafter inverts the line retainer to the line winding position and rotatably drives the rotary frame to remove a dip of the drawn-out line and waits for a bite from a fish. In this condition, when a fish bites and the tip of the rod is raised quickly to pull the line to strike the fish, the rotary frame idle-runs in about one rotation to a maximum, at which time the line cannot be pulled. As a result, there is a risk that the fish after biting is often lost.

SUMMARY OF THE INVENTION

In the light of the above problem, this invention has been designed. An object of the invention is to provide a fishing reel whose rotary frame is reversely rotated to stop always at the position suitable for its reverse swinging motion, and when the line is pulled to reversely rotate the rotary frame, the aforesaid idle rotation of the rotary frame is eliminated without the need to operate the conventional switching means.

The spinning reel of the invention, which includes a rotary frame having a fishing line retainer reciprocally swingable between the line winding position and the line release position, a drive mechanism for driving the rotary frame, and a spool on which the line is wound by the rotary frame rotatably driven by the drive mechanism, is provided with a first anti-reverse-rotation mechanism having a plurality of teeth and restraining the rotary frame from reverse rotation, a second anti-reverse-rotation mechanism having one tooth corresponding to the suitable inversion position for the line retainer, a switching means having an operating member for switching the first and second anti-reverse-rotation mechanisms between the operating position and the non-operating position, and a release mechanism for releasing the anti-reverse-rotation function of the first anti-reverse-rotation mechanism when the switching means has switched the first and second anti-reverse-rotation mechanisms to the operating positions to reversely rotate the rotary frame. The second anti-reverse-rotation mechanism enabling the rotary frame to stop at a proper position always suitable for the inversion of retainer, and the first anti-reverse-rotation mechanism eliminates the idle rotation of the rotary frame in the direction of reverse rotation.

The first anti-reverse-rotation mechanism of the invention mainly comprises a first gear having at the outer periphery a number of teeth and an anti-reverse-rotation pawl engageable with one of the teeth, and the second anti-reverse-rotation mechanism mainly comprises a second gear having one tooth and an anti-reverse-rotation pawl engageable therewith. The release mechanism is of three types. First, the anti-reverse-rotation pawl is put in the operating position where it is engageable with the first gear and the drive mechanism reversely rotates the rotary frame so that the first gear is rotatable in condition of engaging at one tooth with the pawl. Second, the reverse rotation of the rotary frame by the drive mechanism is utilized to control the pawl to shift from the first position where it engages with the tooth at the first gear to the second position where it does not engage with the same. Third the reverse rotation of the first gear is permitted when the drive mechanism reversely rotates the rotary frame.

In any type, the first anti-reverse-rotation mechanism, when the drive mechanism reversely rotates the rotary frame, does not function to restrain the rotary frame from reverse rotation, but the second anti-reverse-rotation mechanism can stop the rotary frame at the predetermined position. On the other hand, when a hooked fish or handling of the fishing rod, pulls the line to reversely rotate the rotary frame, the first anti-reverse-rotation mechanism is adapted to immediately impede the reverse rotation of the rotary frame, thus enabling solution of the above-described conventional problems.

These and other objects of the invention will become more apparent in the detailed description and examples which follow.

BRIEF DESCRIPTION OF THE DRAWINGS

FIG. 3 is a sectional view of a second anti-reverse-rotation mechanism only, FIG. 4 is a sectional view of a first anti-reverse-rotation mechanism only, FIG. 5 is a partially cutaway side view of a second embodiment of the fishing reel of the invention.

FIG. 6 is a partially cutaway plan view of the principal portion at the second embodiment.

DETAILED DESCRIPTION OF THE INVENTION

Figure 1:
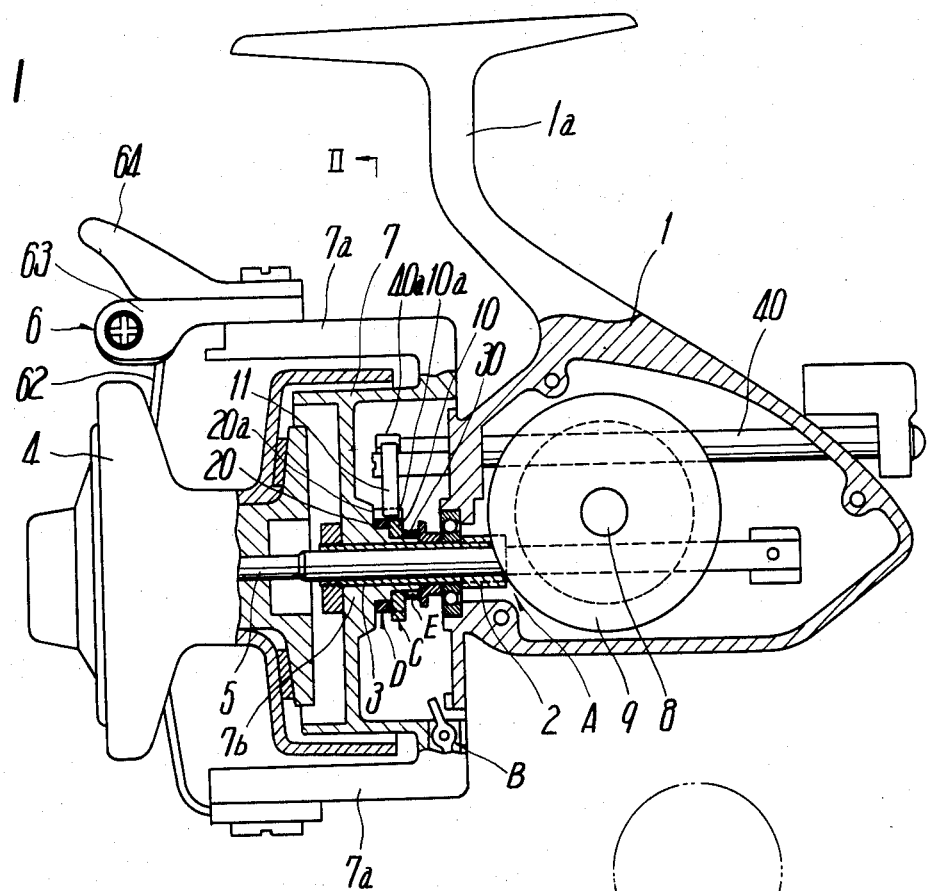
FIG. 1 is a partially cutaway side view of a first embodiment of a fishing reel of the invention.
Figure 2:
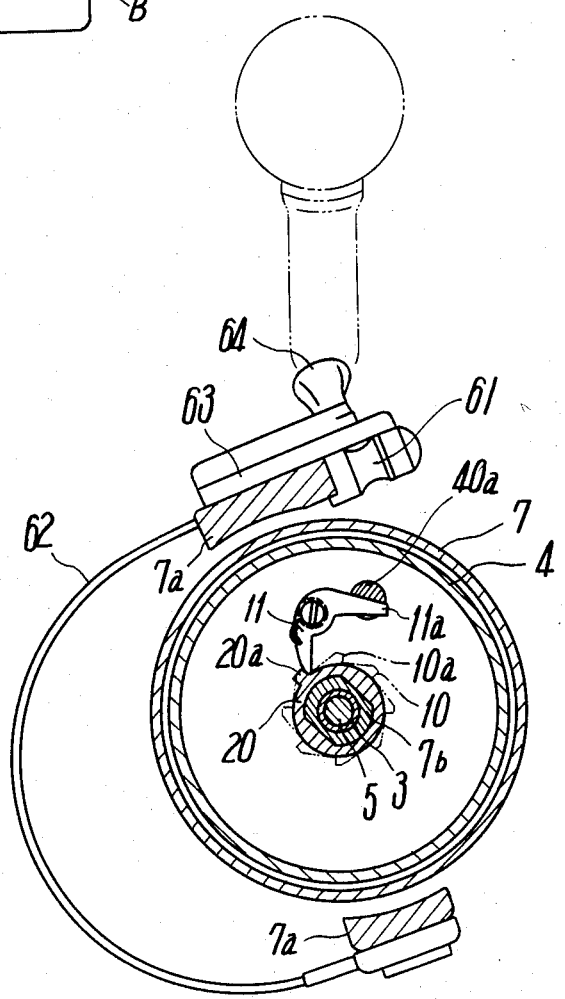
FIG. 2 is a sectional view taken on the line II—II in FIG. 1.

Referring to FIGS. 1 through 4, a first embodiment of the fishing reel of the invention is shown, which is basically constructed such that a hollow reel body 1 has at the upper surface thereof a mounting leg 1a for a fishing rod and at the front wall a through bore. A tubular drive shaft 3 having a pinion 2 is insertably supported into the through bore through bearings. A spool shaft 5 having a spool 4 is supported into a shaft bore at the drive shaft 3 in relation of being rotatable and movable longitudinally of the reel body 1, and a rotary frame 7 having a fishing line retainer 6 reciprocally swingable between the line winding-up position and the line releasing position is mounted to the outer periphery of the front end of the drive shaft 3. A handle shaft 8 extending perpendicularly to the axis of drive shaft 3 is supported rotatably at one side wall of reel body 1, and a master gear 9 in mesh with the pinion 2 is provided at the projection of handle shaft 8 into the reel body 1. A handle (not shown) is attached to the external projection of handle shaft 8 and is operated to rotate the drive shaft 3 and rotary frame 7. Spool 4 is axially moved in reciprocation by means of a reciprocation mechanism (not shown) to thereby wind the line onto the spool 4. The handle, handle shaft 8, master gear 9, pinion 2 and drive shaft 3 constitute a drive mechanism A.

The line retainer 6 comprises a bail arm 62 having an arm roller 61 and mounted across a pair of support arms 7a at the rotary frame 7. Line retainer 6 also includes an arm cam 63 for allowing the bail arm 62 to stop selectively at the fishing line winding position or the line releasing position, and an inversion lever 64.

Between the rotary frame 7 and the reel body 1 is provided an inversion mechanism B of internal kick construction, which automatically switches the line retainer 6 from the line releasing position to the line winding position by being driven by the rotary frame 7.

The fishing reel of the invention constructed as abovementioned is provided in the driving system for the rotary frame 7 with a first anti-reverse-rotation mechanism C having a plurality of teeth 10a; a second anti-reverse-rotation mechanism D having one tooth 20a corresponding to the suitable position to the inversion swinging motion of line retainer 6; and a release mechanism E for releasing the anti-reverse-rotation function of first anti-reverse-rotation mechanism C when the rotary frame 7 is reversely rotated by the drive mechanism A. The second anti-reverse-rotation mechanism D allows the rotary frame 7 to stop always at the suitable position to the inversion swinging motion and also the first anti-reverse-rotation mechanism C eliminates idle rotation of rotary frame 7 in the direction of reverse rotation.

The first embodiment shown in FIGS. 1 through 4, 12 and 15 assembles the first and second anti-reverse-rotation mechanisms C and D and release mechanism E between the boss 7b at the rotary frame 7 and the front wall of reel body 1, the first anti-reverse-rotation mechanism C comprising an anti-reverse-rotation pawl 11 and a first gear 10 having at the outer periphery a number of teeth 10a engageable with the pawl 11. Second anti-reverse-rotation mechanism D comprises the pawl 11 in common with first anti-reverse-rotation mechanism C; and a second gear 20 having one tooth 20a engageable with the pawl 11. Release mechanism E is so constructed that in the position where the anti-reverse-rotation pawl 11 is operated to engage with the first and second gears 10 and 20 and when the rotary frame 7 is reversely rotated by the drive mechanism A, the first gear 10 is rotatable under the predetermined resistance in condition of keeping the pawl 11 in engagement with one tooth 10a at the first gear 10.

The first and second gears 10 and 20 are juxtaposed at the outer periphery of boss 7b of rotary frame 7, the first gear 10 being supported rotatably to the boss 7b, and the second gear 20 being supported non-rotatably thereto. A spring 30 is wound around the drive shaft 3 to bias the first gear 10 toward the second gear 20, thereby applying to the first gear 10 a rotational resistance with respect to the rotary frame 7.

This resistance is set to overcome a line pulling force by a hooked fish or a load applied on the line in handling the rod, so that the first gear 10, when the rotary frame 7 is reversely rotated by the line pulling force, is rotatable together with the rotary frame 7, and when the driving mechanism A reversely rotates the rotary frame 7, first gear 10 slips to rotate with respect to the rotary frame 7. Hence, the hooked fish pulls the line so that the rotary frame 7, even when intended to reversely rotate, is restrained from its reverse rotation.

The pawl 11 is adapted to be biased by a spring in the direction of engaging with the tooth 20a and one of teeth 10a and to be switched between the position where the pawl 11 engages with the teeth 10a and 20a and the position where the pawl 11 does not engage with the same, by operating a switching means supported across the front and rear walls of reel body 1 and having an operating member 40 operable from the exterior. Also, an arm 11a engageable with a cam 40a provided at the utmost end of operating member 40 is provided at the root of pawl 11.

Now, the angler, when using the fishing reel of the invention constructed as abovementioned, operates the handle after switching the anti-reverse-rotation pawl 11 to the position where it is to be engageable with the teeth 10a and 20a, and reversely rotates the rotary frame 7, so that the pawl 11 engages with the one tooth 10a or the tooth 20a, thereby restraining the reverse rotation of rotary frame 7.

During the above reverse rotation of rotary frame 7, in case that the pawl 11 engages with the one tooth 10a only because the tooth 20a is apart from the pawl 11, the rotary frame 7 operated by the handle is forced to reversely rotate against the rotational resistance to the first gear 10. Hence, the pawl 11 is inevitably engageable with the tooth 20a, thereby restraining the rotary frame 7 from reverse rotation. As a result, the inversion lever 64 at the line retainer 6 provided at the rotary frame 7 can stop at the position opposite to the mounting leg 1a at the reel body 1 and optimum to invert the lever 64, e.g., using the angler's finger of his hand which grips the rod. Accordingly, it is extremely easy to invert the line retainer 6 from the line winding stage to the lne releasing stage for casting.

Next, the angler, after casting, turns the line retainer 6 to the line winding position and rotates the rotary frame 7 to remove a dip from the line and waits for a bite of a fish. Under such condition, in a case where the tooth 20a is apart from the pawl 11 and the tooth 10a only engages with the pawl 11, when a fish bites to apply a reverse rotational force to the rotary frame 7, the rotational resistance of first gear 10 restrains the rotary frame 7 from reverse rotation. Hence, the idle rotation of rotary frame 7 is eliminated to enable the line to be pulled to meet a bite of a fish.

Alternatively, the first and second gears 10 and 20 may be supported onto the drive shaft 3, or the tooth 20a may be integral with the boss 7b at the rotary frame 7 or the drive shaft 3. Also, the spring 30 may be substituted by a resistance applying means, such as a friction plate.

The release mechanism E in the first embodiment allows the first gear 10 in engagement with the pawl 11 to reversely rotate overcoming the rotational resistance applied by the spring 30 when the rotary frame 7 is reversely rotated by the drive mechanism A, thereby releasing the anti-reverse-rotation function of first anti-reverse-rotation mechanism C. Alternatively the reverse rotation of rotary frame 7 by the drive mechanism A may be used to disengage the anti-reverse-rotation pawl 11 from the first gear 10 as shown in a second embodiment shown in FIGS. 5 and 6.

Figure 12:
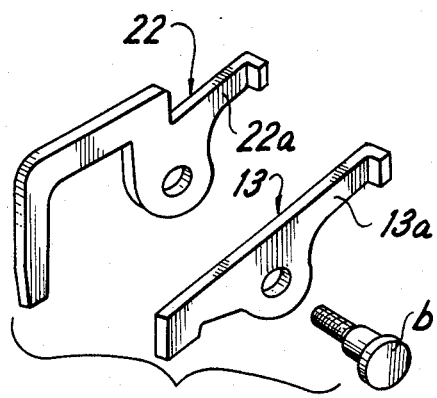
FIG. 12 is an exploded perspective view of portions of FIG. 5.

The second embodiment in FIGS. 5, 6 and 12 incorporates the anti-reverse-rotation mechanisms C and D into the reel body 1 and is constructed as follows.

The master gear 9 constituting the drive mechanism A is supported rotatably to the handle shaft 8, and an engaging projection 91 is provided at one side surface of master gear 9. Drive control 31 having engaging portions 31a engageable with the projection 91 when the rotary frame 7 is rotatably driven, is supported not-rotatably to the handle shaft 8, and a release spring 32 is wound onto the handle shaft 8. A first gear 12 constituting the first anti-reverse-rotation mechanism C and a second gear 21 constituting the second anti-reverse-rotation mechanism D are supported not-rotatably to the drive shaft 3 positioned within the reel body 1, and first and second anti-reverse-rotation pawls 13 and 22 corresponding to the first and second gears 12 and 21 respectively are pivotally supported to the reel body 1 and biased by springs (not shown) in the direction of engaging with each tooth 12a and a tooth 21a at the gears 12 and 21 respectively. As shown in FIGS. 5 and 12, pawls 13 and 22 are fitted to pivot shaft b such that pawls 13 and 22 are pivotally supported to pivot shaft b. In addition, the engaging projection 91 serves as an association mechanism for drive control 31 and master gear 9, so that the master gear 9, after rotation at the predetermined angle with respect to the handle shaft 8, is driven thereby.

The release spring 32 is retained at one end to the first anti-reverse-rotation pawl 13, and, when the handle shaft 8 reversely rotates, the pawl 13 is adapted to automatically disengage from the one tooth 12a. In addition, in the second embodiment, the release mechanism E comprises the drive control 31 and release spring 32, and at the roots of pawls 13 and 22 are provided arms 13a and 22a engageable with a cam 41a at the utmost end of an operating member 41 supported to the reel body 1 and constituting the switching means. Thus, the operating member 41 is operated to switch the pawls 13 and 22 to the disengaging positions respectively.

The release spring 32 is coiled around the handle shaft 8 in contact with the outer periphery thereof so that, when the handle shaft 8 reversely rotates, the coiled portion contracts in diameter to rotate together with the handle shaft 8, and when the same normally rotates, a slip is created between the coiled portion and the handle shaft 8.

Referring to FIGS. 5 and 6, when the handle is operated to reversely rotate the rotary frame 7 in condition of switching the first and second anti-reverse-rotation pawls 13 and 22 to the positions where they engage with the teeth 12a and 21a respectively, the release spring 32 rotates together with the handle shaft 8 to switch the first pawl 13 only to disengage from the first gear 12 and then the rotary frame 7 reversely rotates until the tooth 21a at the second gear 21 engages with the second pawl 22. The engagement of the gear 21 with the pawl 22 restrains the rotary frame 7 from reverse rotation and the inversion lever 64 at the line retainer 6 stops always opposite to the mounting leg 1a and at the position optimum to inversion swinging motion, thereby facilitating the inversion of line retainer 6 for casting.

Next, after casting, the line retainer 6 is turned to the line winding position to remove a dip of the line to wait for a bite of fish, at which time if the tooth 21a is apart from the second pawl 22 and the tooth 12a only engages with the first pawl 13, the reverse rotational force by the hooked fish is applied through the rotary frame 7 to the first gear 12 in engagement with the first pawl 13 to thereby restrain the rotary frame 7 from reverse rotation. Hence, the idle rotation of rotary frame 7 is eliminated and the angler can pull the line to meet a bite of fish.

Furthermore, the release mechanism of the invention may be modified to provide a third embodiment as shown in FIGS. 7 through 11, 14.

This release mechanism uses a clutch mechanism to release a first gear 14 constituting the first anti-reverse-rotation mechanism C when the drive mechanism A reversely rotates a rotary frame 70.

Figure 7:
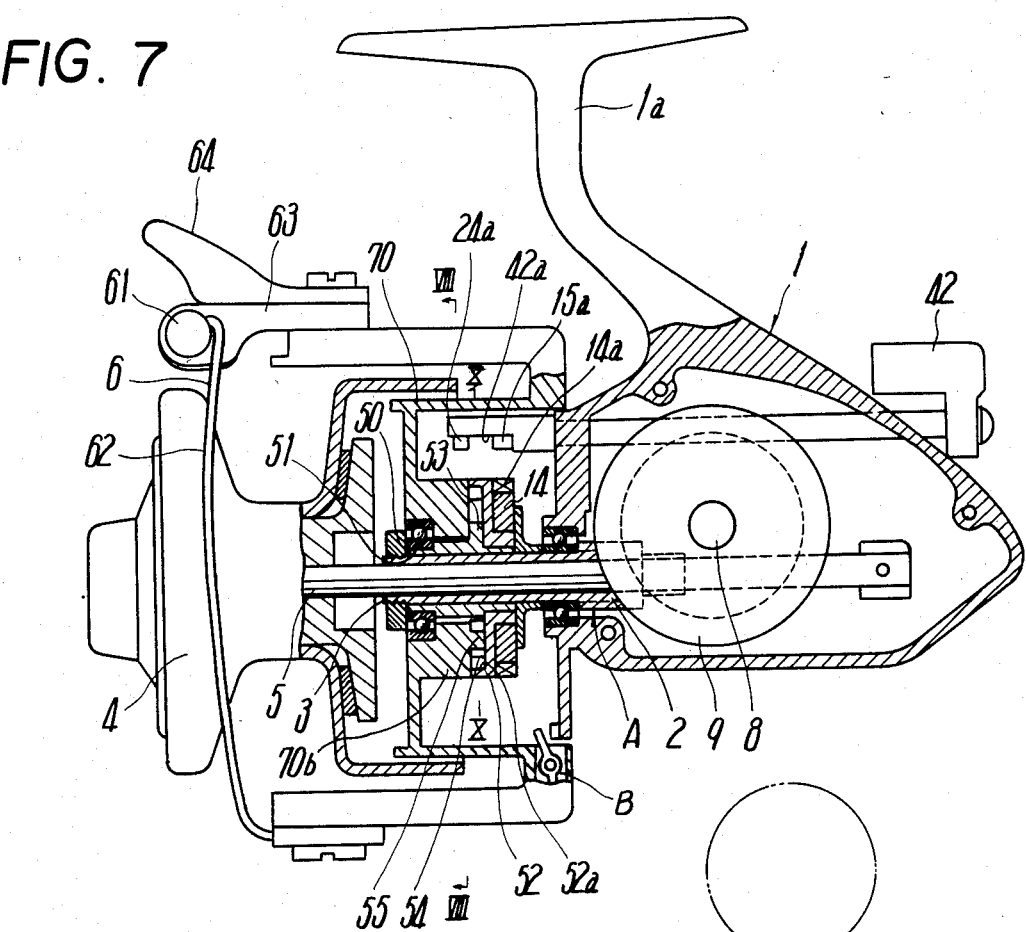
FIG. 7 is a partially cutaway side view of a third embodiment of the invention.
Figure 8:
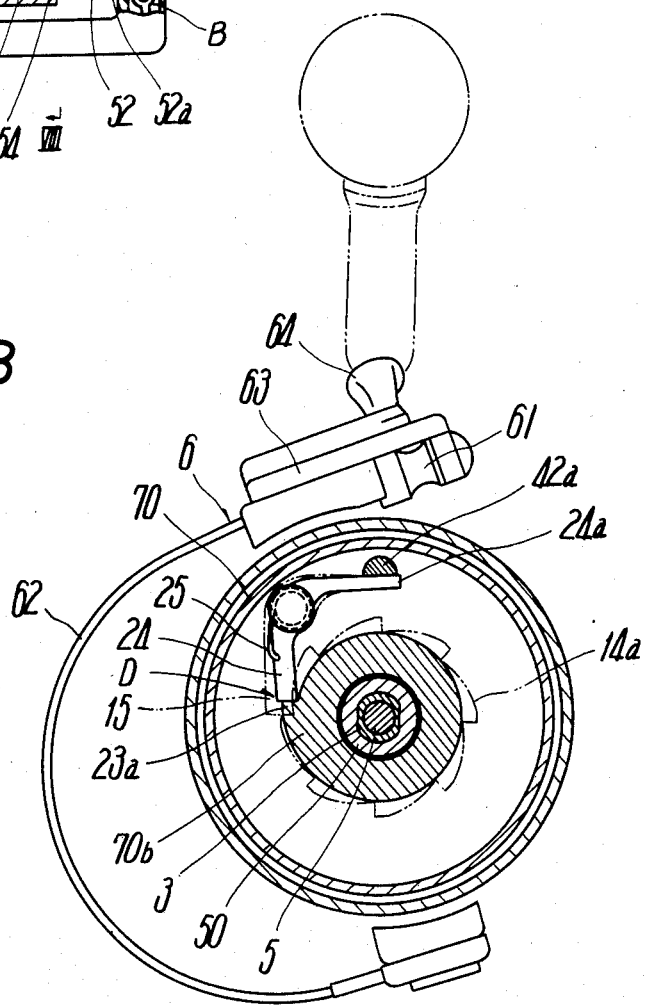
FIG. 8 is a sectional view taken on the line VIII—VIII in FIG. 7.
Figure 9:
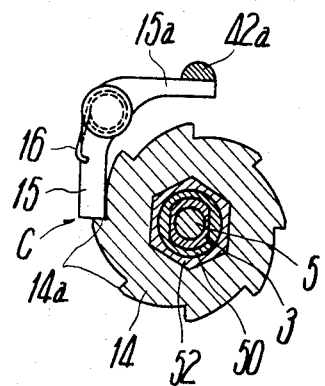
FIG. 9 is a sectional view of a first anti-reverse-rotation mechanism only of the third embodiment.

The third embodiment in FIG. 7 is so constructed that a tubular member 50 is supported onto the outer periphery of drive shaft 3 in relation of being not-rotatable relative thereto. A boss 70b at the center of rotary frame 70 is supported rotatably to the outer periphery at one axial end of tubular member 50 through a bearing 51, and a control cylinder 52 having at the inner periphery thereof a plurality of teeth 52a is supported rotatably to the outer periphery at the other axial end of the same. First gear 14 provided at the outer periphery with a number of teeth is supported to the outer periphery of a boss at the control cylinder 52 not-rotatably relative thereto, and a tooth 23a at a second gear constituting the second anti-reverse-rotation mechanism D is formed at the outer periphery of boss 70b of rotary frame 70 and integral therewith. A first anti-reverse-rotation pawl 15 engageable with the one tooth 14a at the first gear 14 and a second anti-reverse-rotation pawl 24 engageable with the tooth 23a at the second gear, are pivoted to the reel body 1 and biased by springs 16 and 25 in the direction of engaging with the teeth 14a and 23a respectively.

Figure 10:
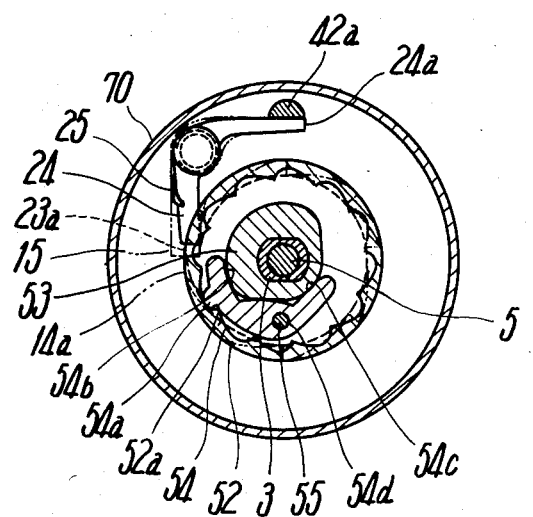
FIG. 10 is a sectional view taken on the line X—X in FIG. 7.
Figure 11:
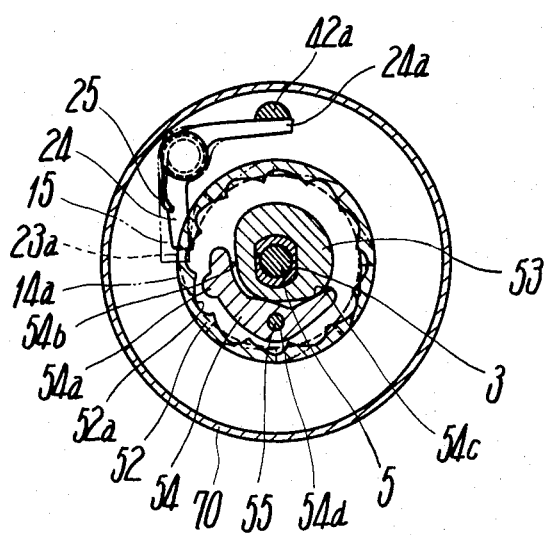
FIG. 11 is a sectional view explanatory of a release mechanism in operating condition, corresponding to FIG. 10.

The release mechanism, as shown in FIGS. 7, 10 and 11, comprises a cam 53 integral with or separate from the tubular member 50 and fixed thereto and a clutch means 54 engageable with or disengageable from each tooth 52a at the control cylinder 52.

As best shown in FIG. 11, the clutch means 54 is pawl-like-shaped. Clutch means 54 is pivoted at an intermediate portion to the inside surface of boss 70b, and is disposed between the teeth 52a at control cylinder 52 and the cam 53, so that the drive shaft 3 is operated to reversely rotate the cam 53 and the clutch means 54 disengages from the tooth 52a at the control cylinder 52. Also, when the rotary frame 70 is reversely rotated by a pull of the line, the clutch means 54 is adapted to engage with the tooth 52a at the control cylinder 52.

The control cylinder 52 has at the center a through bore and at the outer periphery of one side surface a cylindrical portion having at the inner surface thereof the teeth 52a. Control cylinder 52 is fitted at the boss rotatably onto the tubular member 50, and fixedly supports the first gear 14 at the outer periphery of the boss. Alternatively, the control cylinder 52 and rotary frame 7 may be supported rotatably and directly to the drive shaft 3.

The cam 53 is about fan-like-shaped and has cam faces at both sides, which may be integral with drive shaft 3.

The clutch means 54 is made about arcuate, has, at the outer surface of one end, a pawl 54a engageable with each tooth 52a, and at the inner surface, engaging portions 54b and 54c engageable with the cam 53 respectively. Clutch means 54 is pivoted by a shaft bore 54d at an intermediate portion onto a pivot shaft 55 provided at the rotary frame 70.

Alternatively, the teeth 14a at the first gear 14 may be integral with the control cylinder 52. The tooth 23a in the second anit-reverse-rotation mechanism D may be separate from the rotary frame 70 and supported nonrotatably thereto. At the roots of first and second anti-reverse-rotation pawls 15 and 24 are provided arms 15a and 24a engageable with a cam 42a at the utmost end of operating member 42 of switching means supported to the reel body 1 and operable from the exterior, the operating member 42 being operated to switch the pawls 15 and 24 to the disengaging position.

Next, in a case where the third embodiment of fishing reel is used, the handle is operated to normally rotate the drive shaft 3, and the cam 53 rotates together with the drive shaft 3. Clutch 54 swings through the cam 53 toward the engaging position with the one tooth 52a as shown in FIG. 10, and pawl 54a engages with the tooth 52a. Rotary frame 70 normally rotates through the cam 53, clutch means 54 and pivot shaft 55, and simultaneously the control cylinder 52 and first gear 14 rotate together with the rotary frame 70 through the pawls 54a and tooth 52a.

Also, after the first and second anti-reverse-rotation pawls 15 and 24 are switched to be engageable with the teeth 14a and 23a respectively, the handle is operated to reversely rotate the drive shaft 3, and then the cam 53 rotates together with the drive shaft 3. As a result the clutch means 54 swings to disengage the pawl 54a from the tooth 52a as shown in FIG. 11, at which time the rotary frame 70 is subjected to a reverse rotational force from the drive shaft 3 through the cam 53, clutch means 54 and pivot shaft 55, and leads to reverse rotation.

Now, in a case where the first anti-reverse-rotation pawl 15 engages only with the one tooth 54a at the first anti-reverse-rotation mechanism C because the tooth 23a at the second anti-reverse-rotation mechanism D is apart from the second anti-reverse-rotation pawl 24 during the reverse rotation of drive shaft 3, the drive shaft 3 is reversely rotated by the handle and the rotary frame 70 reversely rotates together with the drive shaft 3 until the tooth 23a engages with the second pawl 24. The engagement therebetween can restrain the drive shaft 3 and rotary frame 70 from reverse rotation, whereby the inversion lever 64 at the line retainer 6 can stop always opposite to the mounting leg 1a and at the position optimum to inversion swinging motion. Accordingly, the angler can easily move line retainer 6 from the line winding stage to the line release stage for casting. In addition, the control cylinder 52 and first gear 14 are hindered from rotation by virtue of enagement of the tooth 14a with the first pawl 15, but are disconnected from the rotary frame 70, whereby the reverse rotation of rotary frame 70 is free until the second anti-reverse-rotation mechanism D is actuated.

Next, the line retainer 6, after the casting, is turned to the line winding position and the drive shaft 3 normally rotates to remove a dip of the drawn-out line to wait for a bite of a fish, at which time the clutch means 54 engages with the one tooth 52a as shown in FIG. 10. Under this condition, when a hooked fish applies a reverse rotational force to the rotary frame 7 through the line, the reverse rotational force acts on the pivot shaft 55, clutch means 54 and tooth 52a at the control cylinder 52, thereby making the control cylinder 52 rotatable in reverse together with the rotary frame 70. Then the tooth 14a of the first gear 14 at the first anti-reverse-rotation mechanism C engages with the first anti-reverse-rotation pawl 15 to thereby restrain the control cylinder 52 from its reverse rotation. As a result, the idle rotation of rotary frame 7 is eliminated to enable the line to be pulled to meet a bite of a fish.

As seen from the above, the fishing reel of the invention is provided with the first anti-reverse-rotation mechanism having a plurality of teeth, the second anti-reverse-rotation mechanism D having one tooth corresponding to the optimum position to inversion swinging motion of the line retainer, and the release mechanism for releasing the anti-reverse-rotation function of first mechanism. The second anti-reverse-rotation mechanism and the release mechanism reversely rotate the rotary frame in the anti-reverse-rotation mode thereof to enable the line retainer to stop always at the optimum position for inversion of the retainer. Furthermore, the first anti-reverse-rotation mechanism can hinder the rotary frame from idle rotation by the pulling force acting on the line. Hence, the preparatory operation for casting is simple and easy and the line can be pulled to meet a bite of a fish, thereby making a remarkable good catch.

Although several embodiments have been described, they are merely exemplary of the invention and not to be construed as limiting, the invention being defined solely by the appended claims.

What is claimed is:

1. A spinning reel, comprising:

a rotary frame having a fishing line retainer comprising a bail arm reciprocally swingable between a line winding position and a line releasing position, an inversion lever for swinging said bail arm from said line winding position to said line releasing position, a drive mechanism for driving said rotary frame to rotate forwardly or in reverse, a spool for winding-up thereon a fishing line when said rotary frame is rotated forwardly, a first anti-reverse-rotation mechanism including a plurality of teeth, for restraining said rotary frame from reverse rotation, a second anti-reverse-rotation mechanism having one tooth, for stopping said rotary frame in a position where said bail arm is adapted to be swung by operation of said inversion lever by using an angler's hand gripping a rod on which said reel is mounted from the line winding position to the line releasing position when said rotary frame is driven to reversely rotate, a switching means having an operating member, for switching said first and second anti-reverse-rotation mechanisms between an operating position and a non-operating position, and a release mechanism, responsive to said drive mechanism driving said rotary frame to rotate in reverse, for releasing said first anti-reverse-rotation mechanism from its function of restraining reverse rotation of said rotary frame, wherein said drive mechanism includes a drive shaft, said drive shaft supports said rotary frame rotatably, said first anti-reverse-rotation mechanism has a first gear having said plurality of teeth and a first anti-reverse-rotation pawl engageable with one of said teeth at said first gear, said second anti-reverse-rotation mechanism has a second gear having said one tooth and a second anti-reverse-rotation pawl engageable with said one tooth, said first gear being supported rotatably with respect to said drive shaft, said second gear being supported non-rotatably with respect to said rotary frame, and a locking means is disposed between said first gear and said rotary frame for locking said first gear, said rotary frame and said drive shaft with each other when said drive mechanism rotates said drive shaft forwardly and when said rotary frame rotates in reverse due to a pull of the fishing line by a hooked fish, said locking means including means for releasing said locking between said first gear and said drive shaft when said drive mechanism rotates said drive shaft in reverse, thereby driving said rotary frame only.

2. A spinning reel according to claim 1, wherein said locking means comprises a swingable control pawl, said drive shaft has a cam member having a first cam face for controlling a swinging motion of said control pawl and a second cam face for transmitting a driving force to said rotary frame through said control pawl, said first gear having engaging portions engageable with said control pawl, so that engagement of said control pawl with said engaging portions locks said rotary frame, said drive shaft and said first gear integrally with each other, and disengagement of said control pawl from said engaging portion releases said locking between said drive shaft and said first gear.

* * * * *